Dec. 18, 1934.  E. O. KEATOR  1,984,930
JACK
Filed Jan. 9, 1933  4 Sheets-Sheet 1
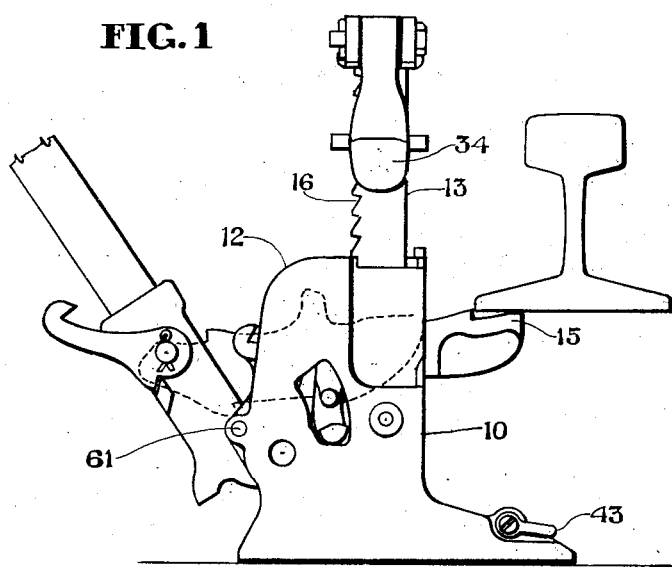
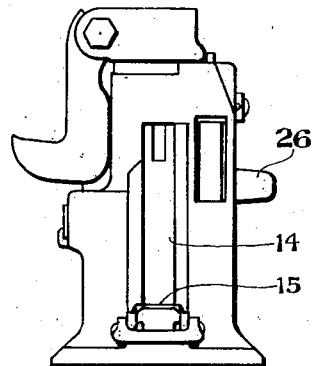
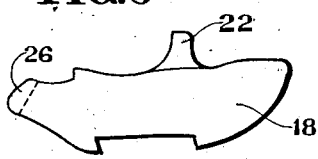
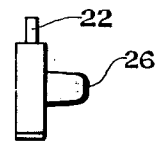
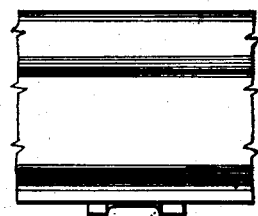
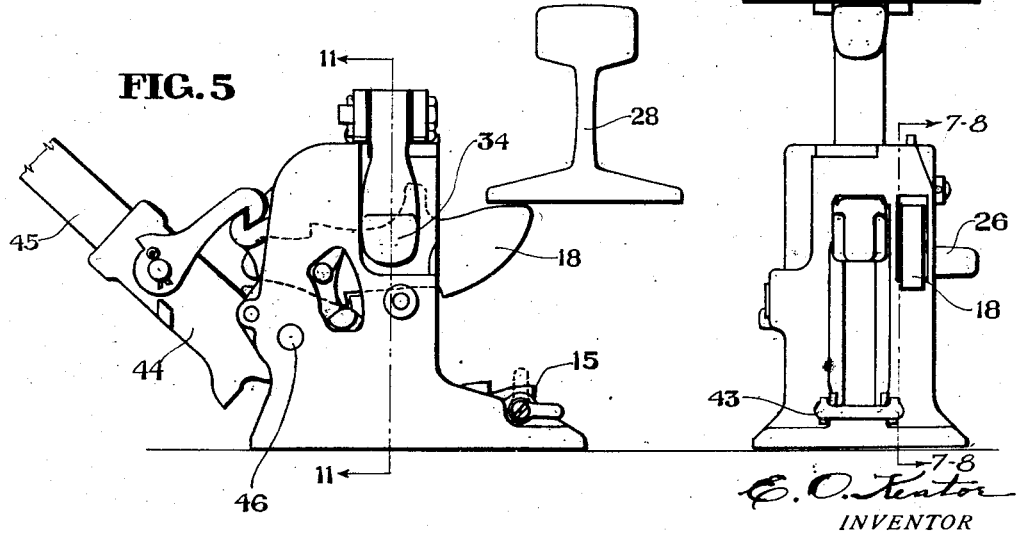

Dec. 18, 1934.  E. O. KEATOR  1,984,930
JACK
Filed Jan. 9, 1933   4 Sheets-Sheet 2

E. O. Keator
INVENTOR

BY Maréchal & Noë
ATTORNEY

Dec. 18, 1934.　　　　E. O. KEATOR　　　　1,984,930
JACK
Filed Jan. 9, 1933　　　4 Sheets-Sheet 3
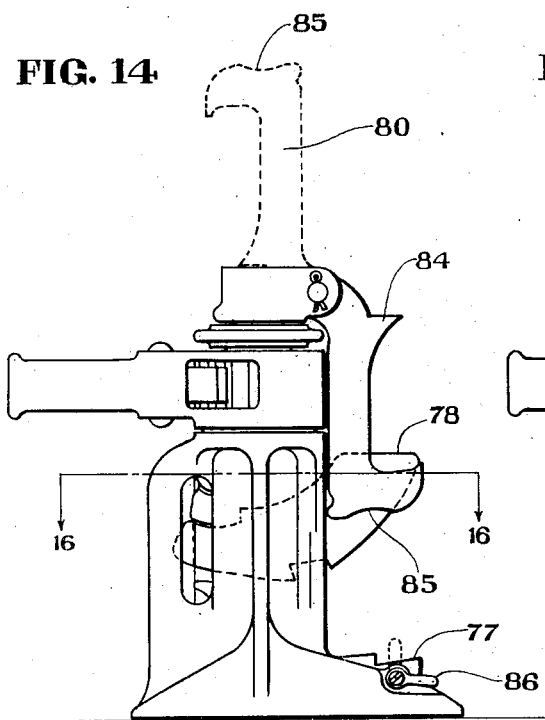
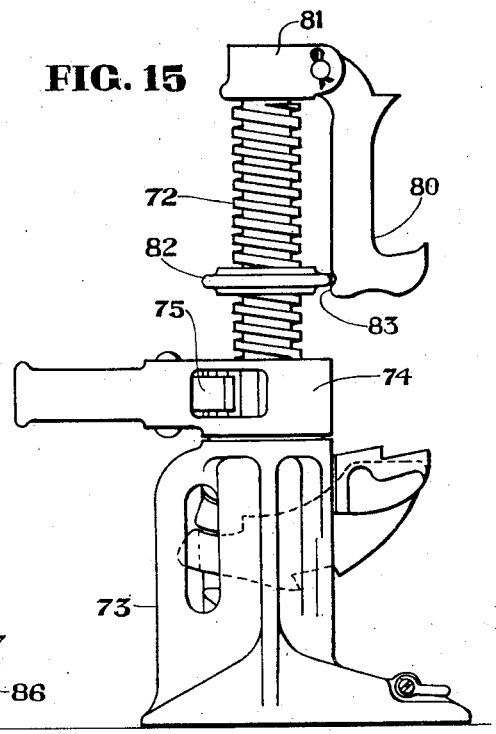
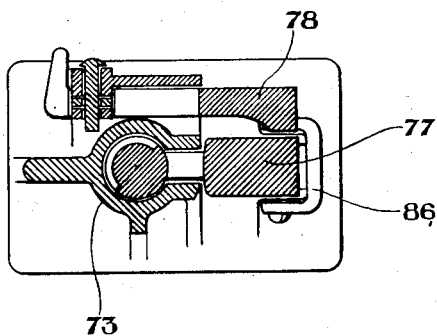
E. O. Keator
INVENTOR
BY　Marechal & Noé
ATTORNEY Dec. 18, 1934.  E. O. KEATOR  1,984,930

JACK

Filed Jan. 9, 1933    4 Sheets-Sheet 4

E. O. Keator
INVENTOR

BY Maréchal & Noe
ATTORNEY

Patented Dec. 18, 1934

1,984,930

UNITED STATES PATENT OFFICE 1,984,930

JACK

Edward O. Keator, Dayton, Ohio

Application January 9, 1933, Serial No. 650,779

15 Claims. (Cl. 254—110)

This invention relates to lifting jacks.

One object of the invention is the provision of a lifting jack in which the load may be raised by one lifting element of a lifting bar, and then transferred to another lifting element for further raising movement so that the total distance through which the load is moved is not limited by the total range of movement of the lifting bar.

Another object of the invention is the provision of a lifting jack having a movable rest to which the load can be transferred after it has been raised a certain distance by one element of the lifting mechanism and so that it can be engaged by another element of the same lifting mechanism for further movement.

Another object of the invention is the provision of a lifting jack having a foot operated rest which is normally retracted in the jack housing, but which may be readily moved outwardly into a position below a load.

Another object of the invention is the provision, in a jack of the character described, of a trip element adapted to positively move the two lifting pawls by means of which the lifting bars are successively moved.

Other objects and advantages of the invention will be apparent from the following description, the appended claims and the accompanying drawings, in which—

Fig. 1 is a side elevation of a jack embodying the present invention, showing a track rail elevated by the lower supporting step of the jack;

Fig. 2 is a front elevation of the jack in its collapsed position;

Figs. 3 and 4 are detail views of the rest;

Fig. 5 is a side elevation of the jack showing the load supported by the rest;

Fig. 6 is a front elevation of the jack showing the load on the upper load support;

Figure 7:
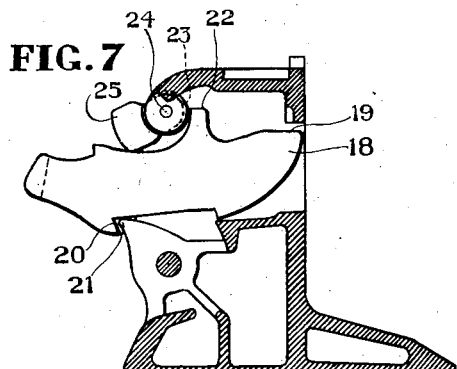
Figure 8:
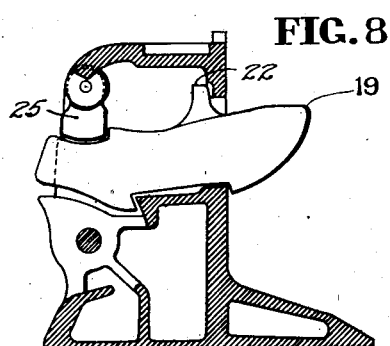
Figure 9:
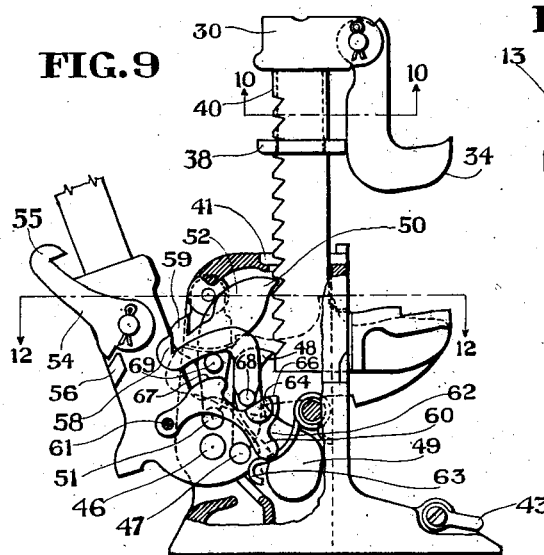
Figure 10:
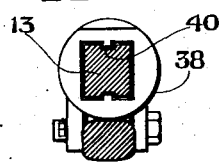
Figure 11:
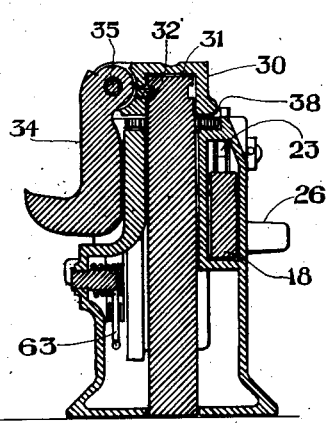
Figure 12:
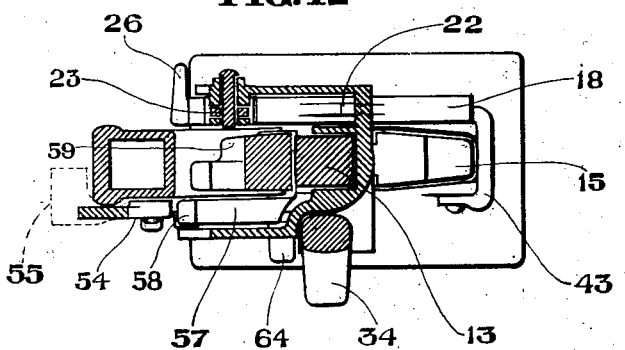
Figure 13:
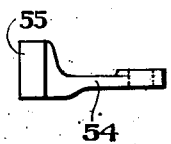
Figure 17:
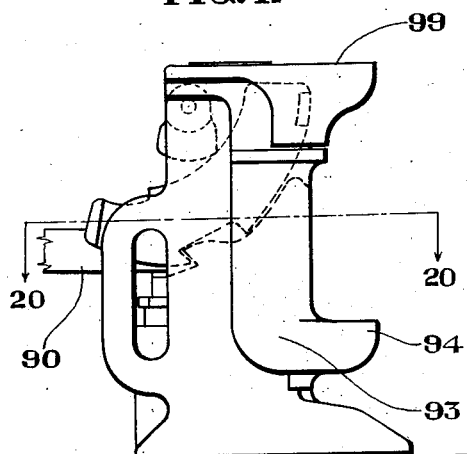
Figure 18:
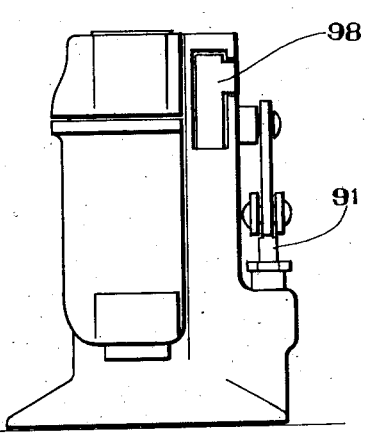
Figure 19:
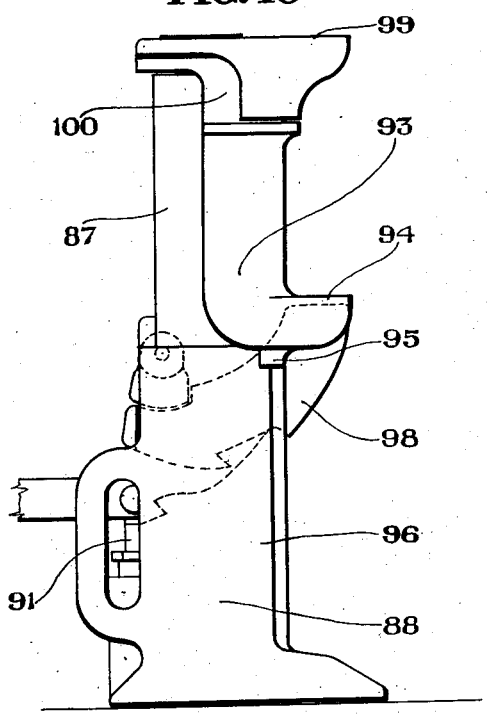

Figs. 7 and 8 are sectional views taken on the lines 7—7 and 8—8 respectively of Fig. 6;

Fig. 9 is a side elevation of the jack showing the housing partly broken away to disclose the lifting and tripping mechanism;

Fig. 10 is a horizontal section on the line 10—10 of Fig. 9;

Fig. 11 is a vertical section on the line 11—11 of Fig. 5;

Fig. 12 is a horizontal section taken on the line 12—12 of Fig. 9;

Fig. 13 is a detailed view of the trip lever;

Figs. 14 and 15 are side elevations of a jack of the screw type embodying the invention;

Fig. 16 is a section on the line 16—16 of Fig. 14;

Fig. 17 is a side elevation of a jack of the hydraulic type;

Fig. 18 is a front elevation of the hydraulic jack;

Fig. 19 is a side elevation showing the left element raised; and

Figure 20:
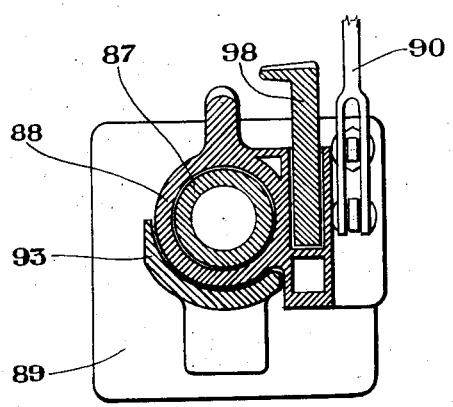

Fig. 20 is a section on line 20—20 of Fig. 17.

Referring more particularly to the drawings by reference numerals, similar numerals designating like parts in the various views, 10 designates the standard of a jack of the general type disclosed in my prior applications Serial Nos. 522,456 and 526,177 filed March 13, 1931 and March 30, 1931 respectively. As herein shown the standard has a foot 11 and a body portion 12 which projects up from the foot and in which is vertically guided the lifting element or bar 13. The forward side of the jack standard is provided with a slot 14. The lifting element or bar 13 has an outwardly projecting load supporting step 15 which operates in the slot 14 just mentioned, as the lifting bar is raised or lowered. It will be understood that normally when the jack is collapsed, as shown in Figs. 2 and 5, the load supporting step 15 is adjacent the bottom end of the standard, but when the lifting bar is raised, the step will be moved up to an upper limiting position near the top of the standard as shown in Fig. 1. Any suitable mechanism may be used for operating the lifting bar 13, such as a double pawl arrangement adapted for successive engagement with the notches or teeth 16 in the side of the lifting bar, as will be presently described.

Movably mounted in the standard, as shown in Figs. 1, 7 and 8, is a load rest 18. The load rest is slidably mounted so that it may be moved outwardly or projected from its normally housed condition shown in Fig. 7, in which it will be noted that the load supporting nose 19 is retracted within the standard and out of the path of movement of the load at the time the load is being raised by the step 15. The rest 18 is preferably notched at 20 and gravity holds the left-hand end of the rest down against the projection 21 on the standard in the position as shown in Fig. 7, while an upward projection 22 bears against part 23 of the arm 25 thus limiting the rest in a definite retracted position until such time as it is desired to project the rest outwardly below the elevated load.

Fig. 1 shows the load raised to the upper limit of movement of the step 15, just slightly above the position of the rest 18. After the load has been raised this far, the operator, by pushing upwardly and forwardly, preferably by his foot, on a lateral projection 26 at the rear end of the rest, may slide the rest first upwardly and then forwardly, so that the load supporting nose 19 will be projected below the load which in this case is shown in the form of a rail 28. The projected position of the rest is as shown in Figs. 8 and 5, the latter figure showing the load assumed by the rest after the load supporting step 15 has been lowered, or dropped, and the lifting bar returned to its normal retracted position. When the rest is projected forwardly the rear end of the rest lowers, after passing over the projection 21 on the standard, to such an extent that the pendulously supported arm 25 which is pivotally mounted at 24 on the standard swings down into engagement with a cooperating portion on the upper rear side of the rest, thus holding the rest from tilting under the weight of the load after it has assumed the load. The projections 22 and 26 of the rest limit the outward movement of the rest by engaging with the standard as will be apparent from Fig. 8.

Rotatably supported in the upper end of the lifting bar is a top or cap member 30, having a cylindrical bore 31 which telescopes over the upper cylindrical end of the lifting bar, a projection 32 fixed in the cap rotating in a groove provided in the upper end of the lifting bar as shown in Fig. 11 so that the cap can be moved rotationally about the longitudinal axis of the bar but is held as respects axial movement on the bar. At one side the cap projects laterally and pivotally supports a hook shaped upper load support 34 by means of a supporting bolt 35. The load support 34 extends downwardly along the side of the bar or standard and then outwardly, forming a projecting load support which, when the lifting bar is retracted, is at a height slightly lower than the top of the rest, as shown in Fig. 5. After the load has been assumed by the rest, the cap 30 and the upper load support 34 may be rotated through 90° from the positon shown in Fig. 5 so as to be brought under the load, and then when the lifting bar is raised again the load is picked up by the support 34 and moved up to a position which may be quite a considerable distance above the top of the jack standard, as shown in Fig. 6. The lower load support 15 is stepped or notched as shown in order that the load will be held away from the standard a sufficient amount to permit the support 34 being moved into its load raising position.

It will thus be understood that the load may be raised a distance commensurate with the height of the standard or rather a distance commensurate with the total range of the lifting bar, and then transferred to a rest. It may then be picked up by a second lifting element of the lifting bar and raised to a greater height. Of course, the jack could also be used for lowering a load in the same way, first assuming the load on the upper load support 34, then transferring the load to the rest, raising the lifting bar again to assume the load on the lower step 15, and then the load may be lowered still further provided of course the support 34 has first been swung out laterally and the rest withdrawn to its normal housed position in the standard.

In accordance with the present invention the jack may be made comparatively light in weight although of a very rugged character and capable of assuming great loads and raising or pushing the loads to a very substantial degree despite the fact that the jack itself may, when collapsed, have a comparatively small total height. A jack of this character is particularly adapted for elevating the rails of a track, or for moving a portion of a track laterally. When used for moving a track laterally, the jack may be somewhat inclined so that the longitudinal axis of the lifting bar is canted over toward the rail. As the lowermost position of the step 15 is quite close to the ground, this step may be readily inserted under the rail and the rail then forced upwardly and consequently outwardly, first to the limit of movement of the step 15 and then through the range of movement of the upper load support 34, thus shoving the entire track laterally or taking a kink or other irregularity out of the track.

The top of the load engaging portion of the hook 34 is at a definite distance from the top of the cap 30, somewhat less than the total lifting movement of the bar 13, so that the load may be engaged by the top of the cap after it has been moved to the upper limit of movement of the hook and after the lifting bar has been lowered so that a rail or track can be moved laterally in three successive lifting or extension movements of the bar 13 without displacing the position of the jack base.

As shown in Figs. 9 and 10, means are provided for transmitting thrust strains directly from the lower end of the hook or support 34 to an intermediate portion of the lifting bar to maintain a proper positioning of the support 34 when the load is assumed by it. Thus a spacing element or part 38 is movably supported on the lifting bar so as to serve as an abutment for the lower inner side of the hook 34 in order that undue strains will not be imposed on the cap 30 and also to hold the hook out so that the load may be raised above the standard without danger of unshipping when the hook glides over the upper edge of the standard, and so the load may be lowered without striking the inner side of the hook against the standard. The ring 38 may be provided with key projections engaging in vertical key slots 40 which extend down from the bottom of the cap 30 to the position of the ring shown in Fig. 9. This permits the lifting bar to be collapsed in the standard, with the spacing ring 38 supported in a groove 41, see Figs. 9 and 11. When the lifting bar is initially raised from its collapsed position, however, either at the side or front of the jack the hook 34 rides along the jack housing which assumes the thrust of the load the spacing ring 38 remaining in the groove 41 until the key projections on the ring are at the lower ends of the slots 40, after which the ring will be picked up by the lifting bar.

The pivotal manner in which the upper load supporting hook 34 is mounted on the top of the lifting bar forms a convenient means for rapidly raising the lifting bar up forcibly against the load. The hook 34 may be grasped by the hand, and as the cap 30 permits swinging movement of the hook to any desired position, it will be apparent that one hand grasping the hook 34 can quickly force the top of the cap 20 up against the load in a forcible manner, so that the load can then be lifted by the proper movements of the operating mechanism without loss of time and unnecessary labor.

The load supporting hook 34 on the upper end of the lifting bar forms a convenient handle by which the jack may be carried from one place to another, and in order to hold the lifting bar in its retracted position while the jack is being carried, a pivoted bail 43 is rotatably supported in the foot of the standard and so arranged that it may normally be maintained in a horizontal position outside of the range of movement of the lifting step 15, but adapted to be raised so as to straddle the opening in the foot of the standard and prevent elevating movements of the lifting step 15 and consequent elevating movements of the lifting bar.

The operating means for the lifting bar of the jack shown in Figs. 1 to 13 preferably comprises an operating lever 44 having a socket for the detachable handle 45. The lever 44 is pivotally supported at 46 on the standard. Pivotally supported at 47 on the lever 44 is a pawl 48 having a pointed end adapted for engagement with the notches or teeth in the lifting bar. This pawl 48 is provided with means such as a weighted portion 49 which normally tends to hold the pawl in engagement with the notches. As the lever 44 moves downwardly the pawl 48 is raised. When the lever 44 moves upwardly, the lifting bar is raised by means of a second pawl 50 pivotally supported at 51 on the lever 44 and having a weighted portion 52 which serves to normally hold the pawl in engagement with the teeth or notches in the lifting bar. It will be apparent that as the handle 45 is moved up and down, each movement causes one or the other of the pawls to force the lifting bar upwardly and bring the other pawl into engagement with the teeth of the bar for a subsequent raising operation.

Pivotally supported on the lever 44 is a trip 54 having an enlarged laterally extending hooked end 55, see Fig. 13. Normally the trip 54 is maintained by gravity in the position shown in Fig. 9 against a stop 56. However, when it is desired to trip the lifting bar so that the lifting bar may drop to a collapsed position, the handle 45 may be removed, permitting the enlarged hooked end 55 of the trip to be swung to the position shown in Fig. 5, into engagement with hooked portions 58 and 59 of both pawls 48 and 50. The pawl 48 is provided with a rearward extension 57, see Figs. 9 and 12, its hooked portion 58 being provided at the rear end of the extension and at one side of the hooked portion 59 of pawl 50 as shown in Fig. 12, and as the hooked end 55 of the trip is wide enough to extend over both the hooks 58 and 59, it will be apparent that when the lever 44 is swung upwardly the trip will be engaged with both pawls ready to pull whichever pawl is in engagement with the load toward the left, as viewed in Fig. 9, as soon as the lever 44 is swung downwardly again by the operator. Fig. 5 shows the pawls tripped, the lifting bar having dropped so as to leave the load supported on the rest 18. The trip 54 is then swung back to an inoperative position.

The pawls 48 and 50 are preferably so arranged that the lifting bar can be lowered step by step as well as raised step by step. When it is desired to lower the lifting bar step by step, a cam lever 61 is moved from a normally inoperative or lowered position to the position shown in Fig. 9. This cam lever 60 is pivotally supported at 61 on the frame 10 and normally a notch 62 of this lever is engaged by the end 63 of a spring which yieldingly holds the lever 60 entirely free of the lifting pawls regardless of the position of the pawls or of the arm 44. However, when the free end of the cam lever 60 is pushed upwardly by kicking or pulling upwardly on the projecting handle 64, the end 63 of the spring is forced out of the notch 62 and then bears yieldingly against the free end of the lever to hold it upwardly in effective position as shown in Fig. 9. In this effective position camming surfaces 66 and 67 successively engage the laterally projecting pins 68 and 69 on the pawls 48 and 50 so as to force the pawls successively out of engagement with the notches and permitting the bar 13 to be lowered step by step under the control of first one pawl and then the other during oscillating movements of the lever 44.

The invention, as herein set forth, is not limited to a lever operated type of jack, as the lifting bar may be operated by other means. For example, as shown in Figs. 14, 15, and 16, the lifting bar 72 is threaded so that it may be raised in the standard 73 by means of a rotatable nut provided in the movable operating member 74 and operated by a suitable ratchet device 75 as an operating handle, oscillated back and forth. The nut is of course held against axial movement in the standard in any suitable manner as is well known in screw jacks. The lower load supporting step 77 is fixed to the lower end of the screw 72 and projects through a slot in the standard and thus holds the screw against rotational movements.

A load applied to the lower load support 77 may be raised up to the position shown in Fig. 15 after which the load supporting rest 78 is shoved forwardly from its normally housed position so as to be projected below the load in a manner similar to the form of jack first described. The screw 72 is then lowered leaving the load supported on the rest 78 and the upper load supporting hook 80 is then swung around into the position shown in Fig. 15 so that the load can be picked up by this part when the lifting bar is again raised. The cap 81 is of course rotatably mounted on the upper end of the screw or lifting bar, and an abutment or spacing ring 82 is slidable on the screw and arranged so as to be engaged by a notch 83 in the upper load support as soon as the lower end of the latter is raised above the operating device 74. Subsequent raising movements of the screw 72 cause spacing ring 82 to move upwardly and hold the lower end of the load support 80 the proper distance out from the axis of the lifting bar.

The lifting range of the jack shown in Figs. 14 to 16, and the length of the hook 80 is such that the top of the load engaging portion of hook 80 is slightly below the load position when the lifting screw 72 is retracted and when the load has been elevated to the upper limit of travel of the load supporting step 77. Furthermore the height to which the load supporting hook 80 can raise the load is such that the cap 81 can be placed below the load after the lifting screw 72 has been retracted, provided, of course, the load is otherwise prevented from returning during the time the cap 81 is being brought into engagement with it. The hook 80 is also preferably provided with a spur 84 which may be stabbed into the load and which also functions as a brace means engageable with the top of cap 81 when the hook 80 is turned through 180° so as to assume the position shown in dotted lines as shown in Fig. 14. When the hook 80 is in its inverted position as shown in dotted lines, the load may be given a further pushing or raising movement by engaging it with the surface 85 of the hook and then elevating the lifting screw 72.

A holding bail 86 adapted to be swung up to prevent lifting movements of the load supporting step 77 may be provided to prevent elevating movements of the lifting screw and constructed generally in the same manner as the bail referred to in the direction of Figs. 1 to 13 inclusive.

Figs. 17 to 20 inclusive illustrate another form of jack in which the load is raised by hydraulic pressure. In this case the lifting element is a plunger 87 telescopically received in a cylinder 88 provided by the jack standard 89. An operating lever 90 may be manipulated to work the pump plunger 91 up and down and thus create pressure for the supply of liquid to the interior of the cylinder 88 below the piston and cause elevating movements of the lifting element 87.

On the upper end of the lifting element 87 and rotatably mounted thereon for movement about the axis of the plunger element 87 is a depending load supporting step 93 having a load supporting projection 94. The step 93 is preferably cylindrically curved on a side adjacent the standard as shown in Fig. 20, and at the lower end of the step 93 is fixed a slide block 95 which rides on a slide surface 96 on the standard, thus transmitting thrust loads applied to the portion 94 of the jack directly to the side of the standard and preventing strain on the pivot element.

The load supporting step 93 is adapted to raise the load, being movable from a position as shown in Fig. 17 to an extended position as shown in Fig. 19. The load may then be supported substantially at the upper limit of travel of the load supporting step 93 by means of the rest 98 which is normally retracted in the housing as shown in Fig. 17 out of the way of the load, but which may be pushed forwardly and upwardly to the position shown in Fig. 19 so that the load may be held on this rest while the step 94 is being lowered and while the upper step 99 is being moved from a side position to an outwardly extending position in which it is illustrated in Fig. 19. The upper load supporting step 99 is rotatably mounted at the top of piston 87 and is provided with a cylindrically concaved side surface engaging the cylindrically convex surface 100 of the lower load supporting element or step 93, the operation and construction of this jack being generally similar to the forms of construction previously described except for the differences that have been just explained.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A lifting jack comprising a standard, a lifting element movable therein, operating means for the lifting element, a load supporting step operated by said element for lifting the load to a predetermined position with relation to the standard, and a rest slidably guided on an upper portion of said standard for movement into position below the load after the load is in said predetermined position.

2. A lifting jack comprising a standard, a lifting element movable therein, operating means for the lifting element, a load supporting step operated by said element for lifting the load to a predetermined position with relation to the standard, a rest slidably supported on said standard for movement into position below the load after the load is raised by said supporting step, and a projecting lug positioned on said rest and adapted to be moved by the foot of the operator.

3. A lifting jack comprising a standard, a lifting element movable therein, operating means for the lifting element, a load supporting step operated by said element for lifting the load to a predetermined position with relation to the standard, a rest slidably supported on said standard for movement into position below the load after the load is raised by said supporting step, and an arm pendulously supported by said standard and movable to a holding position against said rest but adapted to be swung out of said holding position when the rest is moved in the standard toward an inoperative position.

4. A lifting jack comprising a standard, a lifting element movable therein, operating means for the lifting element, a load supporting step operated by said element for lifting the load to a predetermined position with relation to the standard, a rest provided on the standard to support a load lifted thereto by the load supporting step, and a hook of predetermined length mounted on said element and adapted to lift the load from the rest to a position beyond the upper limit of movement of said step.

5. A lifting jack comprising a standard, a lifting element movable therein, operating means for the lifting element, a load supporting step operated by said element for lifting the load to a predetermined position with relation to the standard, a rest provided on the standard to support a load lifted thereto by the load supporting step, and an upper load support rotatably mounted for movement about the line of lifting movement and projecting outwardly from said element for lifting the load beyond the limit of movement of said step.

6. A lifting jack comprising a standard, a lifting element movable therein, operating means for the lifting element, a load supporting step operated by said element for lifting the load to a predetermined position with relation to the standard, a rest movably mounted for bodily movement on the standard for movement into position below the load after the load is in said predetermined position, and an upper load support operated by said element for lifting the load beyond the limit of movement of the said step.

7. A lifting jack comprising a standard, a lifting element movable therein, operating means for the lifting element, a load supporting step operated by said element for lifting the load to a predetermined position with relation to the standard, a rest slidably mounted in said standard for sliding movement in a direction substantially transverse of the lifting element into position below the load after the load is in said predetermined position, and an upper load support rotatably mounted on the upper end of the said lifting element and projecting outwardly therefrom for lifting the load beyond said rest.

8. A lifting jack comprising a standard, a lifting element movable therein, a load supporting step operated by said element for lifting the load to a predetermined position with relation to the standard, a rest movably mounted on said standard for movement into position below the load after the load is in said predetermined position, a cap rotatably mounted on the top of said lifting element, means of operating said lifting element, and a hook pivotally supported on said cap for lifting the load beyond the upper limit of movement of said step.

9. A lifting jack comprising a standard, a lifting element movable therein, operating means for said element, a load supporting step operated by the element for moving the load to a predetermined position with relation to the standard, a rest movably mounted on said standard for movement into position below the load after the load is in said predetermined position, means on the said rest for positioning with the operator's foot, an arm pendulously supported by said standard and movable to a holding position against said rest, and a hook on said lifting element adapted to engage the load while on said rest and while the lifting element is substantially at its lowest position.

10. A lifting jack comprising a standard, a lifting element movable therein, operating means for the lifting element, a lifting hook mounted on an upper portion of said lifting element, and a spacing member serving as an abutment between the lower end of the hook and the lifting element to transmit thrust loads imposed on said hook directly to the lifting element, and to maintain substantially the same space between the hook and the element when the hook is elevated.

11. A lifting jack comprising a standard, a lifting element movable therein, operating means for the lifting element, a load supporting step operated by said lifting element for lifting the load to a predetermined position with relation to the standard, an upper load support on the upper end of said lifting element and projecting outwardly and downwardly therefrom for lifting the load above the top of the standard, said load support engaging the side of the standard when the lifting element is retracted, and a movable spacing member positioned so as to serve as an abutment to transmit thrust loads imposed on said hook directly to the lifting element after the said upper support has moved beyond the standard.

12. A lifting jack comprising a standard, a lifting element movable therein, operating means for the lifting element, a load supporting step provided adjacent the lower end of said lifting element and operated thereby to lift the load when the said element is raised from a normal retracted position, a rest slidably supported in said standard for movement into position below the load after the load is raised by the supporting step, an upper load support rotatably mounted on the upper part of said lifting element and projecting outwardly therefrom for lifting the load above the top of the standard, and a spacing member positioned to serve as an abutment to transmit thrust loads imposed on said upper load support directly to the lifting element after the said upper support has been moved beyond the standard.

13. A lifting jack comprising a standard, a lifting element movable therein, operating means for the lifting element, a load supporting step on the lower end of said lifting element, and a shackle movably mounted on said standard and adapted to be moved over said step and restrain the upward movement thereof.

14. In combination in a lifting jack, a standard, a lifting element movable therein, operating means for the lifting element, a load supporting step provided adjacent the lower end of said lifting element and operated thereby to lift the load when the element is raised from a normal retracted position, an upper load supporting hook pivotally attached adjacent the upper end of said element, and a shackle movably mounted on the standard and adapted for straddling said step to prevent upward movement of said lifting element.

15. A lifting jack comprising a standard, a lifting element movable therein, raising means for the lifting element, trip means for said raising means, a load supporting step on the lower end of said element for lifting a load to a predetermined height with relation to said standard, a rotatably mounted cap on the upper end of said lifting element, a rigid hook, and a pivotal connection directly between said hook and said cap restraining said hook against any movement on the lifting element excepting movement about an axis extending transversely of the direction of lifting movement, said hook being adapted to be grasped with the hand for quickly raising the lifting element to operating position with respect to the load, said hook depending along the side of the jack standard and having a projecting load supporting surface provided at such a distance above said step as to secure a lifting purchase under the load at substantially the same distance from the bottom of the standard with the lifting element retracted as the upper limit of movement of the load when resting on said load supporting step.

EDWARD O. KEATOR.